Jan. 30, 1962
L. V. GEWISS
3,018,896
FLUID PROPELLING AND FILTERING APPARATUS
Filed March 12, 1958
3 Sheets-Sheet 1
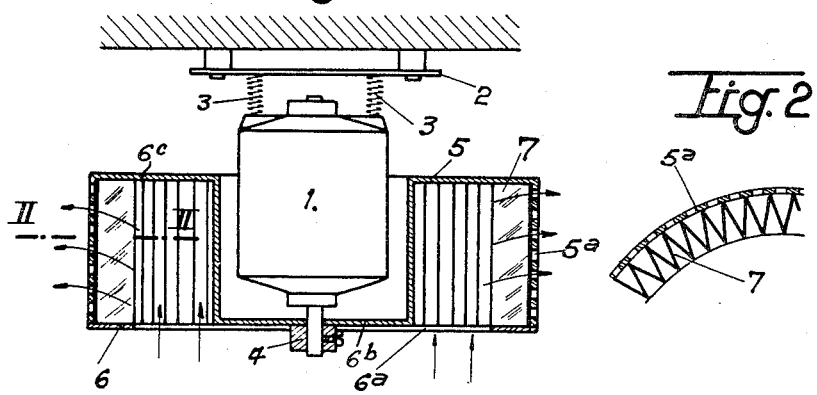
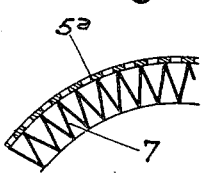
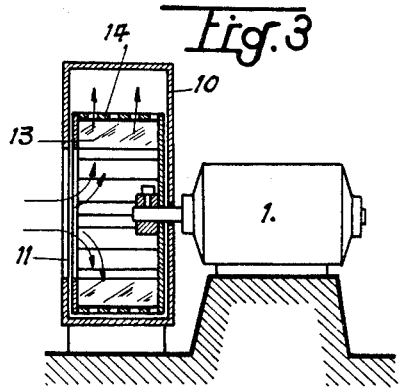
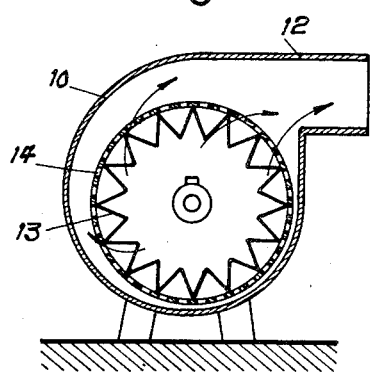
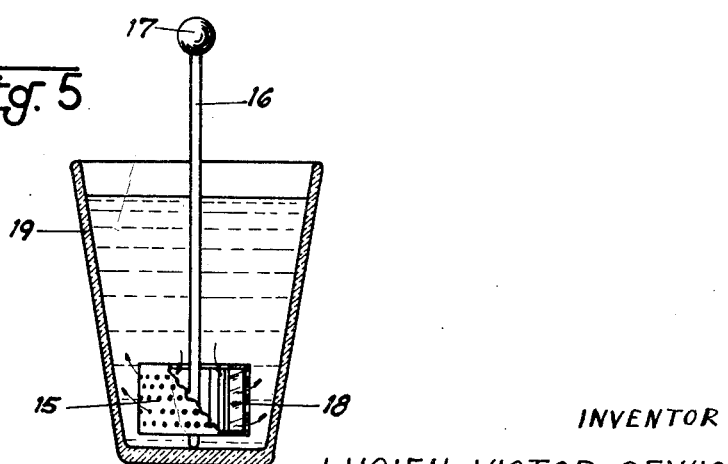
INVENTOR
LUCIEN VICTOR GEWISS
By Linton and Linton
ATTORNEYS Jan. 30, 1962 L. V. GEWISS 3,018,896
FLUID PROPELLING AND FILTERING APPARATUS
Filed March 12, 1958 3 Sheets-Sheet 2

INVENTOR
LUCIEN VICTOR GEWISS
By Linton and Linton
ATTORNEYS

Jan. 30, 1962   L. V. GEWISS   3,018,896
FLUID PROPELLING AND FILTERING APPARATUS
Filed March 12, 1958   3 Sheets-Sheet 3

INVENTOR
LUCIEN VICTOR GEWISS,
BY Diggins + LeBlanc
ATTORNEYS

United States Patent Office 3,018,896
Patented Jan. 30, 1962

3,018,896
FLUID PROPELLING AND FILTERING
APPARATUS
Lucien Victor Gewiss, 20 Rue de Sevres,
Ville d'Avray, France
Filed Mar. 12, 1958, Ser. No. 720,908
8 Claims. (Cl. 210—403)

The present invention has for its object to provide arrangements intended for the separation of solid particles suspended in a volume of liquid or gasiform fluid and, more particularly, arrangements imparting motion to fluid considered with a view to making the latter pass through filter elements adapted to hold back solid particles.

Hitherto, plants of this type have primarily included two separate mechanical systems, to wit: on the one hand, an apparatus adapted to impart the desired movement to a volume of fluid laden with particles to be separated, such as a pump, a fan or a similarly operating part and, on the other hand, a part inserted in the path of the moving fluid and adapted to retain said particles, such as a filtering element or a group of filtering elements, these two systems being interconnected by a pipe arranged either on the upstream side or on the downstream side of the apparatus imparting motion to the fluid, so as to constrain the latter to flow through the system which is adapted to retain the solid particles.

By reason of the unavoidable resistance of appreciable value imparted by the filtering or like means to the passage of the fluid, it is essential in all cases that the connection established between said filtering means and the mechanical means imparting motion to the fluid be perfectly fluid-tight. It is necessary in particular for the movable members of the apparatus imparting motion to the fluid to be carefully constructed to close tolerances and fitted so that the difference in pressure produced by said means between the upstream and the downstream sides may be clearly higher than the actual filtering element resistance opposing the passage of the fluid, even when the inner sections of said filtering element are filled to a substantial extent by the particles retained therein.

This necessity leads either to the requirement of an exacting accuracy in the production of the means imparting motion to the fluid or to the necessity of resorting to mechanical arrangements having a load capacity which is much larger than theoretical requirements, resulting in intricate design requirements and/or an exaggerated bulk and, consequently, a high cost price.

The present invention has for its chief object the provision of simple separating systems having substantially increased efficiency, reduced bulk and considerably lower manufacturing and maintenance costs.

To this end, it primarily involves the combination of the driving and filtering systems into a single system in a manner such that the screening means adapted to hold back the solid particles suspended in the fluid also comprises the movable members imparting movement to the latter, whereby the fluid is propelled through them by their movement.

Starting from this standpoint, my invention comprises a rotary apparatus for imparting motion to a liquid or gasiform fluid, the fluid-driving elements of which are constituted by a continuous annulus of sheet material permeable to the fluid, said sheet material being pleated in a manner such as to provide radial folds adapted to act as blades or like members through which the fluid is drawn and propelled.

More specifically, the present invention covers the provision of an apparatus of the type defined, adapted to impart motion to a liquid or gasiform fluid containing foreign particles, in which the pleated annulus which acts to impart such motion to the fluid is constituted by a permeable material adapted to hold back these foreign particles, so that the fluid drawn in may be urged through said material after it has been freed by the latter from the foreign particles carried along by it. Furthermore, in the case where it is desired to extract from the treated fluid fine solid particles forming a suspension therein, the pleated annulus is constituted by a filtering material adapted to hold back such particles.

It is thus possible to design, in conformity with the present invention, and by way of example, rotary pumps and chiefly pumps adapted to ensure simultaneously the movement and the purification of liquid laden with solid impurities, fans, chiefly fans providing simultaneously for the removal of dust in premises and the ventilation or air-conditioning of the latter, or apparatus for purifying liquids inside a container, for filtering coffee or infusions, fruit juice, or for like purposes.

In these different applications, the permeable sheet material, which serves for forming the movable members of the separating apparatus, should be selected in accordance with the nature of the treated fluid and of the foreign bodies to be removed from the latter and, chiefly, with the degree of fineness of such particles. For instance, said sheet material may be constituted by a fine-meshed fabric of nylon, a piece of felt, filtering paper, a metallic or plastic sieve, or the like.

To form the movable annulus of the apparatus, it is possible to start with a strip of such a material which has been merely folded into the shape of flat folds arranged radially or preferably folded in herringbone formation in accordance with the arrangements described in French Patent No. 1,094,978, dated November 28, 1953, which corresponds to my Patent No. 2,897,971, issued August 4, 1959.

Generally speaking, the annulus thus formed will be advantageously fitted removably and interchangeably inside a perforated or skeleton rotary drum serving as a support, in a manner such that it may be possible to easily provide for its replacement after it clogs up.

The present invention covers also a particular application of the apparatus thus designed for the purification of moving fluid laden with solid impurities, under continuous flow conditions, through the agency of thin filtering layers, according to which application said apparatus is caused to operate under conditions such that it avoids deposits which would normally appear in such thin filtering layers used for said purification, even when the elements of said layers are folded tightly over one another. It should, however, be mentioned that such means are fully operative only if the specific weight of the impurities to be removed is substantially different from the specific weight of the fluid carrying them along.

To obtain this result in conformity with the present invention, there is inserted in the path of the fluid to be purified an apparatus of the type defined hereinabove, wherein the filtering layers are in the shape of an annulus which is pleated or preferably folded into herringbone formation as shown in my Patent 2,897,971, said annulus being housed inside a skeleton drum, the arrangement being such that the totality of the flow is constrained to pass through the drum and the filtering annulus from the outside towards the inside thereof.

As long as the skeleton drum and the filtering annulus carried by it remain stationary, the system behaves with reference to the flow to be purified in the manner of an ordinary filtering element. When the drum starts rotating, however, a centrifugal effect is established both with respect to the fluid and the impurities held in suspension. However, since the intensity of the centrifugal effect is proportional to the masses, the impurities are projected outwardly of the filtering layer in a direction opposed to the direction of flow of the liquid to be purified. There is thus formed around the rotary filtering element an area in which the impurities collect and which are all urged alternatingly into movement in the general direction of the fluid stream and then in the opposite direction, under the action of centrifugal force.

During their travel, the impurities follow paths which are gradually deflected downwardly under the continuous action of gravity. There thus arrives a moment at which each particle of said impurities reaches an area in which neither the flow of fluid nor the centrifugal effect can act. Being protected against all turbulent effects, said particles collect at the bottom of said area through natural sedimentation or decantation.

It is not essential for the rotary system to permanently maintain a rotary movement. It is possible, in fact, to let it stand still as long as its fouling deposits do not act detrimentally on the translated volume of fluid and to start it into movement only during the time required for ensuring the desired cleaning.

Whenever it is possible to stop the main flow of fluid simultaneously with the rotary system, or even to reverse the flow without resulting in any disadvantage, the removal of the clogging material may be performed at a particularly high speed. In this case, however, and in order to obtain the desired efficiency, it should be followed by a suitable period of rest and decantation.

For any filtering system of this type, when operative, there exists an optimum speed of rotation, the value of which depends at the same time on both its diameter and on different necessities arising through the actual nature of the fluid and of its degree of contamination, through the minimum translated volume to be ensured.

Further features of my invention will appear from the following detailed description of various embodiments of the invention, reference being made to the accompanying drawings, which are set forth by way of example and by no means in a limiting sense. In said drawings:

FIG. 1 is an axial sectional view of a first embodiment of a dust-removing fan designed so as to be suspended from the ceiling of a room.

FIG. 2 is a partial horizontal cross-section through line II—II of FIG. 1.

FIGS. 3 and 4 are respectively an axial sectional view and a transverse sectional view of a modified form of a filtering fan for the distribution of conditioned air.

FIG. 5 is an axial cross-section of a modified form employing a small liquid purifier for domestic or laboratory purposes, for the filtering of coffee or fruit juices or the like.

Figure 6:
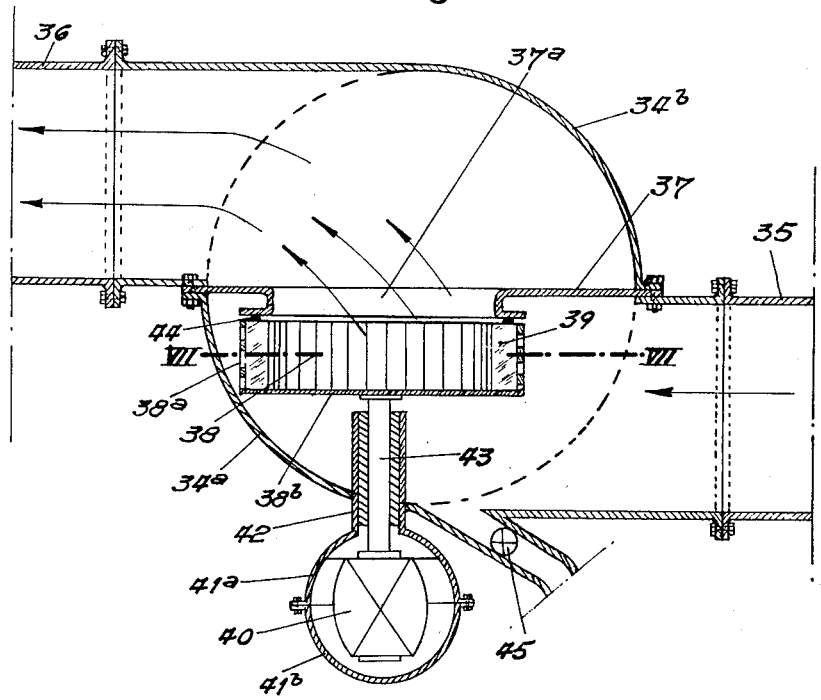
FIG. 6 is a diagrammatic vertical axial sectional view of a modified form of a dust-removing assembly incorporating an apparatus according to the present invention.

The first embodiment of the present invention illustrated in FIG. 1 relates to a filtering fan serving for the purification of the air in small workshops and which is designed so as to allow its suspension from the ceiling of the room, preferably near the center of the room in which it is to be used. Said fan is driven by an electric motor 1 suspended from the support 2 through the agency of a yielding connection constituted in the case illustrated by springs 3. To the motor shaft is secured the hub 4 of a skeleton drum 5 the outer peripheral wall 5a of which is perforated. Drum 5 has an upper annular base 6c and a bottom central smaller base 6b. Motor 1 is received within the central aperture of upper annular base 6c. An annular flange 6 covering the lower end of said drum carries, inside the latter, a filtering annulus 7 fixedly engaging the perforated wall 5a and constituted by an uninterrupted strip of yielding filtering material folded into herring-bone formation as disclosed in my Patent No. 2,897,971 or folded radially in any desired manner.

When the motor 1 is started, the small volumes of air carried between the radial folds of the filtering annulus 7 are given a rotary movement which constrains said air to be urged away from the axis of the fan under the action of centrifugal force, which produces an inflow of air through the central opening 6a in the annular flange 6. The operation is exactly the same as that of a centrifugal fan drum with the difference that the radial folds of the filtering annulus layer 7 replace the usual blades. Although the filtering layer 7 is continuous, the air thus set in motion passes from the inner annular part of the rotary system outwardly because said layer is constituted by a permeable filter. This leads at the same time to a ventilating and to a purifying effect, the dust and the like impurities suspended in the air of the premises being retained on the inner surface of the filtering layer 7.

It should be remarked that the arrangement thus constituted provides maximum efficiency, since the entire centrifugal effect serves, without any possible loss, for urging air through the filtering layer. The translated volume is thus ensured exactly in a ratio inversely proportional to the loss of head opposed by the filtering layer, and it is arrested only when the clogged up layer has no longer any permeability. It is sufficient at such a moment to replace the filtering annulus 7 by a fresh one.

It should also be remarked that the filtering annulus considered may be constituted simply by means of a sheet of filtering material, such as paper, fabric or the like, having a suitable breadth and length, said sheet being pleated flatwise and set in position as uniformly as possible inside the drum 5 without any further step being taken beyond that of fitting inside each other the two terminal folds, so as to ensure the continuity of the annulus. These folded pleats are adapted to act like blades of a fan for propelling the fluid. No gluing and no securing are required since the centrifugal force applies, as soon as the apparatus is started operating, the apices of the fold against the perforated side wall of the drum and closes all the joints.

FIGS. 3 and 4 are an axial cross-section and a transverse cross-section respectively of a fan of a conventional type mounting a spiral scroll intake casing 10 provided with a central suction port 11 and an output nozzle 12 wherein the usual blades of the fan are replaced by a filtering annulus 13 similar to that described hereinabove for the embodiment of FIG. 1 and the filtering annulus is fitted inside a perforated rotary drum 14.

The apparatus thus designed operates after the manner of a conventional fan while it provides however for the filtering of the air passing through it.

FIG. 5 illustrates as a modified form a small filtering device for domestic or laboratory purposes, for a liquid which may be advantageously used for the clarification of beverages such as coffee or fruit juices laden with pulp waste or with chemical substances. Said device includes a drum 15 fitted on a handle 16 provided at its outer end with a ball 17 and adapted to be rotated manually through a rolling of the ball 17 between the hands of the operator. The drum 15 may be constituted by a perforated cylinder inside which is housed a small filtering annulus 18 which is pleated or folded into herringbone formation as in the case of the preceding embodiments, or more simply by a semi-rigid metal or plastic sieve which is also pleated or folded into herring-bone formation. The system being positioned inside the glass or the like container 19 containing the liquid to be clarified, the rotation of said system successively in opposite directions as provided in the manner described, produces through the filtering wall of the drum 15 a continuous flow of liquid which has for its result a rapid collection inside the drum of the impurities held in suspension inside the liquid.

Figure 7:
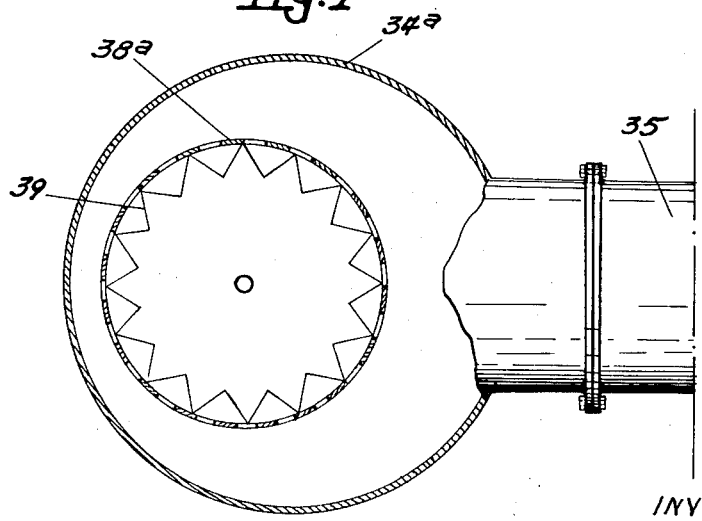
FIG. 7 is a partial horizontal cross-section taken through line VII—VII of FIG. 6.

FIGS. 6 and 7 show a further modification of a filtering assembly of the type which serves for the removal of dust out of a gas-conveying circuit, which ensures at temperatures rising up to several hundreds of degrees centigrade the exchange of heat required for certain thermonuclear power stations.

The gaseous mass serving for such purposes has a considerable volume and it flows under a high pressure with a translated volume above 1000 cub. met. per second inside channels the diameters of which are well above 1 meter.

In said example, the arrangement includes a first spherical shell made of two parts 34a—34b adapted to resist the pressure and the high temperature of the gases which are to be freed of dust. To said shell are connected an intake pipe or header 35 through which the dust laden gases are taken in and, in a diametrically opposed position, an output pipe or header 36.

The lower half shell 34a is provided with a partition 37 in which is formed an opening 37a underneath which is housed a rotary filtering drum 38 constructed in the manner disclosed hereinabove. The drum 38 includes an outer perforated peripheral wall 38a rigid with a solid face 38b: said drum 38 is inwardly lined with a filtering annulus 39 constituted by a very fine metal gauze pleated radially, or better still, folded into herring-bone formation as disclosed in the above-mentioned French Patent 1,094,978 and U.S. application Ser. No. 468,499, now Patent No. 2,897,971. Said drum 38 is carried and driven by a motor 40 which, by reason of the high pressure previaling inside the spherical shell 34a—34b, is housed also inside a second two-part sphere 41a—41b; the two spheres 34a—34b and 41a—41b are interconnected by means of a tube 42 which allows the shaft 43 of the motor to pass through it, said motor 40 secured inside the hemisphere 41a being connected through said shaft 43 with the filtering drum 38.

Figure 8:
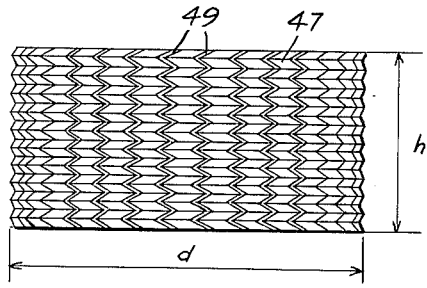
FIG. 8 is a side elevation of a chevroned filter annulus.
Figure 9:
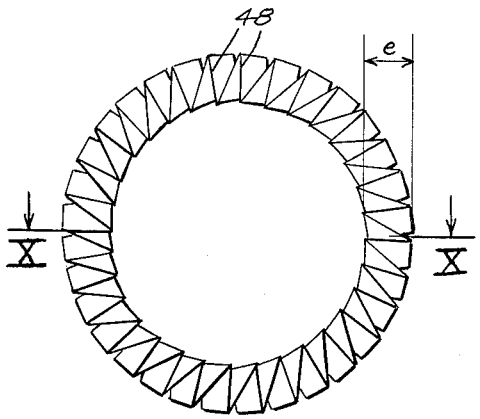
FIG. 9 is a top plan view of the filter annulus of FIG. 8.
Figure 10:
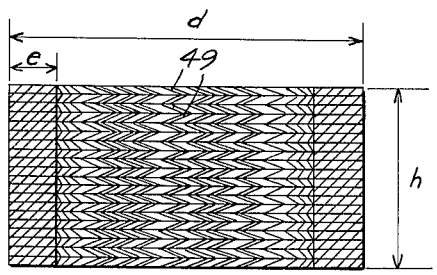
FIG. 10 is a diametrical section taken along line X—X of FIG. 9.

FIGURES 8–10 illustrate a filter annulus fabricated according to the teachings of French Patent 1,094,978, aforementioned. Briefly, the method of fabricating this annulus consists in principle in starting with a sheet of filtering material of generally rectangular form whose dimensions are a function of the diameter $d$, of the height $h$ and of the radial thickness $e$ of the annular filter 47 to be obtained. This sheet is first folded on itself in such manner as to form the folds 48 (FIG. 9), which folds are equal and whose breadth is equal to the radial thickness $e$ of the filter. The folds thus formed are then themselves folded in zig-zag, in such manner as to form small folds 49 which are equal and similar to chevrons (FIGS. 8 and 10). Finally, the sheet of filtering material is rolled up on itself to constitute the filtering annulus, while conforming, by pressing or otherwise, the lateral ends of this sheet, fold for fold, and regularly distributing the ranges of folds in chevrons 49 in such manner that the ranges regularly radiate around the geometrical axis of the filtering annulus, as is clearly shown in the drawings.

The operation of the arrangement of FIGS. 6–7 as described is as follows:

The rotary filtering drum 38 being driven at a moderate rotary speed, the dust-laden gases admitted through the intake pipe 35 are exhausted through the output pipe or header 36 beyond the meshes of the herring-bone shaped metal gauze of filtering annulus 39 through which they pass radially from the outside towards the inside. At 44, a graphite packing prevents the passage of the gases between the moving filtering drum 38 and the stationary partition 37. The gasiform counter current produced by the rotary drum corresponds in fact to a further loss of head which depends of course on the speed of rotation of the drum. The speed of rotation of the drum should be selected so as to be high enough to communicate to the solid foreign particles arrested by the metal gauze a centrifugal repelling action which is large and prevents said impurities from adhering to the drum while remaining sufficiently low so as to produce a loss of head which is as small as possible.

All the particles stopped by the metal gauze 39 of the filtering drum 38 assume thus as disclosed hereinabove a reciprocating movement which leads them gradually to drop to the bottom of the hemisphere 34a whence they may be removed after opening for a few moments the draining opening 45 provided for this purpose.

By reason of the temperature of the gases, the second two part sphere 41a—41b is insulated thermally from the main sphere by means of baffle plates which are not illustrated and which are fitted in the tube 42 while the gases under pressure contained inside the latter are cooled down to a temperature lower than 50° C. as required for the proper operation of the motor, the cooling being provided through an outer circulation of said gases inside an air-cooled radiator which is not illustrated.

The whole dust-removing system thus described operates continuously without the non-oxidizable metal gauze being ever clogged up.

As already mentioned, results which are quite as satisfactory may be obtained by merely starting the filtering drum 38 into rotation only at intervals for cleaning the sieve or else only when the loss of head across the gauze reaches a predetermined value. Means for the automatic starting of the motor under control of said loss of head may be used for such an intermittent operation of the drum. The speed of rotation to be selected should be higher in this case than in the preceding case, so that the removal of the impurities held back by the gauze may be carried out in a more energetic manner.

The above-described arrangements are applicable to the purification of all kinds of fluids. In the different cases, the purified fluid is removed from the central section of the filtering drum while the deposit builds up along its periphery at an upper or at a lower level according as to whether the specific weight of the foreign particles retained by the gauze is lower or higher than that of the fluid.

Of course and as already stated, the examples illustrated have been selected only by way of an indication. The invention may also be applied to the construction of centrifugal pumps or fans adapted chiefly to impart motion to a fluid, without this leading of necessity to a filtering or removal of foreign particles, the rotary annulus acting after the manner of blades so that it may be constituted by a mere perforated metal sheet which is suitably pleated or folded.

On the other hand, in the case where the rotary annulus is constituted by a filtering material and taking into account the fact that such a material is capable of opposing the passage of liquid droplets, while furthering their evaporation, it is apparent that the present invention is also applicable with advantage to the construction of:

Apparatus for diffusing liquids, perfumes, medicinal products, disinfectants, and the like.

Apparatus adapted to form an intimate mixture of a plurality of different gases and/or vapors.

Apparatus adapted to perfect the carburizing action in internal combustion engines by reliably vaporizing the gasoline.

Lastly, it should be remarked that although the permeable filtering annulus which is pleated or folded into a herring-bone formation is sufficient in all cases for mechanically setting in motion the treated fluid, it is possible without unduly broadening the scope of the present invention as defined in the accompanying claims to fit such a permeable filtering annulus inside a mechanical system provided with blades or the like parts of a conventional type; in this case, said filtering annulus would add its own action to that of the mechanical system.

What I claim is:

1. An apparatus for imparting motion to a fluid and simultaneously extracting foreign particles carried by the latter, comprising a cylindrical drum having a continuous bottom base wall, a second upper base wall provided with an opening for the passage of said fluid and further having a perforated peripheral wall, said drum being adapted to be immersed into said fluid, means for driving said drum into rotation around its geometrical axis, and a continuous annulus fitted within said drum against the lateral perforated peripheral wall of said drum, made of a filtering sheet material pleated to form radial folds adapted to act as fan blades through which the fluid is aspirated and propelled from the inside to the outside of said drum and is simultaneously filtered.

2. An apparatus according to claim 1, said sheet material being folded into herringbone formation.

3. An apparatus according to claim 1, in which said annulus is constituted by a strip of filtering material provided with straight transverse folds and the terminal folds of which interengage each other.

4. An apparatus according to claim 1, in which said annulus is constituted by a strip of filtering material provided with chevron-shaped transverse folds and the terminal folds of which interengage each other and lock the ends thereof together.

5. An apparatus according to claim 1, and a spiral scroll casing surrounding said drum and which is provided with a central input opening for the fluid and a peripheral output nozzle.

6. An apparatus according to claim 1, in which said means for driving said drum into rotation comprise a rod coaxial with said drum, means providing a rigid connection between said rod and said drum, and means for the manual rotation of said rod.

7. An apparatus according to claim 1, the sheet of filtering material constituting said annulus being folded in a manner to form radial folds which themselves are further folded in zig-zag to constitute chevrons.

8. An apparatus for imparting motion to a fluid and simultaneously extracting foreign particles carried by the latter, comprising a cylindrical drum having a continuous bottom base wall, a second upper base wall provided with an opening for the passage of said fluid and further having a perforated peripheral wall, said drum being adapted to be immersed into said fluid, means for driving said drum into rotation around its geometrical axis, and a continuous annulus strip fitted within said drum removably against the lateral perforated peripheral wall of said drum, made of filtering sheet material pleated to form radial folds adapted to act as fan blades through which the fluid is aspirated and propelled from the inside to the outside of said drum and is simultaneously filtered.

References Cited in the file of this patent

UNITED STATES PATENTS

| | | |
|---|---|---|
| 302,163 | Saladin | July 15, 1884 |
| 1,025,059 | Hatton et al. | Apr. 30, 1912 |
| 1,273,791 | Knowles | July 23, 1918 |
| 2,272,746 | Holm-Hansen | Feb. 10, 1942 |
| 2,655,310 | Schlumbohm | Oct. 13, 1953 |
| 2,706,016 | Schlumbohm | Apr. 12, 1955 |
| 2,782,933 | Monsarrat | Feb. 26, 1957 |
| 2,795,291 | Pierce | June 11, 1957 |
| 2,824,622 | Buckman | Feb. 25, 1958 |

FOREIGN PATENTS

| | | |
|---|---|---|
| 297,510 | Great Britain | Sept. 27, 1928 |
| 532,467 | Great Britain | Jan. 24, 1941 |
| 126,226 | Austria | Jan. 11, 1932 |
| 218,022 | Switzerland | May 1, 1942 |
| 130,295 | Sweden | Dec. 12, 1950 |
| 1,094,978 | France | Dec. 15, 1954 |